O. R. HUNT.
SPRING STRUCTURE.
APPLICATION FILED OCT. 20, 1916.

1,260,672.

Patented Mar. 26, 1918.
5 SHEETS—SHEET 1.

Witnesses:

Inventor:
Ozello R. Hunt,
By Dyrenforth, Lee, Chritton and Wiles
Att'ys.

O. R. HUNT.
SPRING STRUCTURE.
APPLICATION FILED OCT. 20, 1916.
1,260,672.                                    Patented Mar. 26, 1918.
5 SHEETS—SHEET 2.
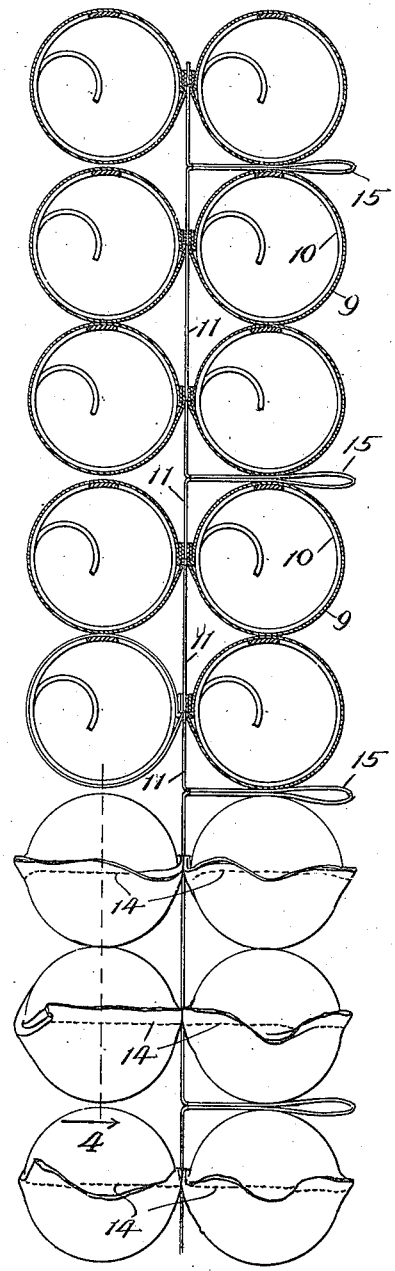
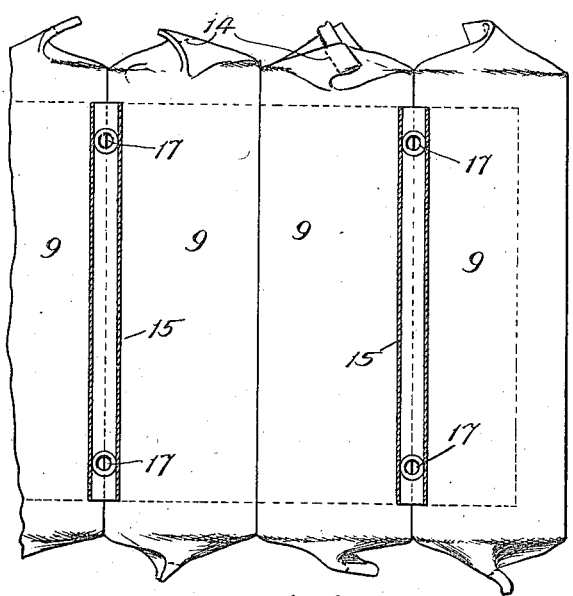
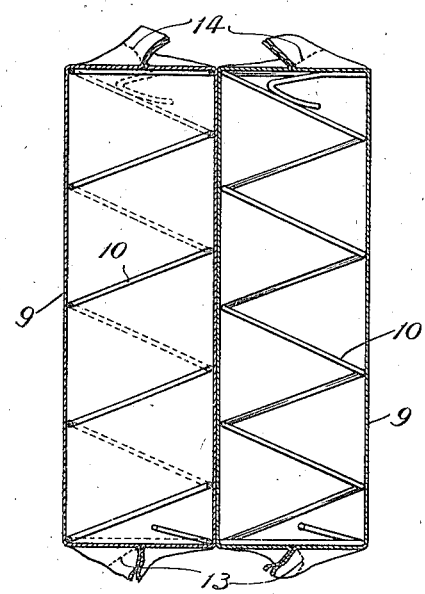
Inventor:
Ozello R. Hunt O. R. HUNT.
SPRING STRUCTURE.
APPLICATION FILED OCT. 20, 1916.
1,260,672.
Patented Mar. 26, 1918.
5 SHEETS—SHEET 3.
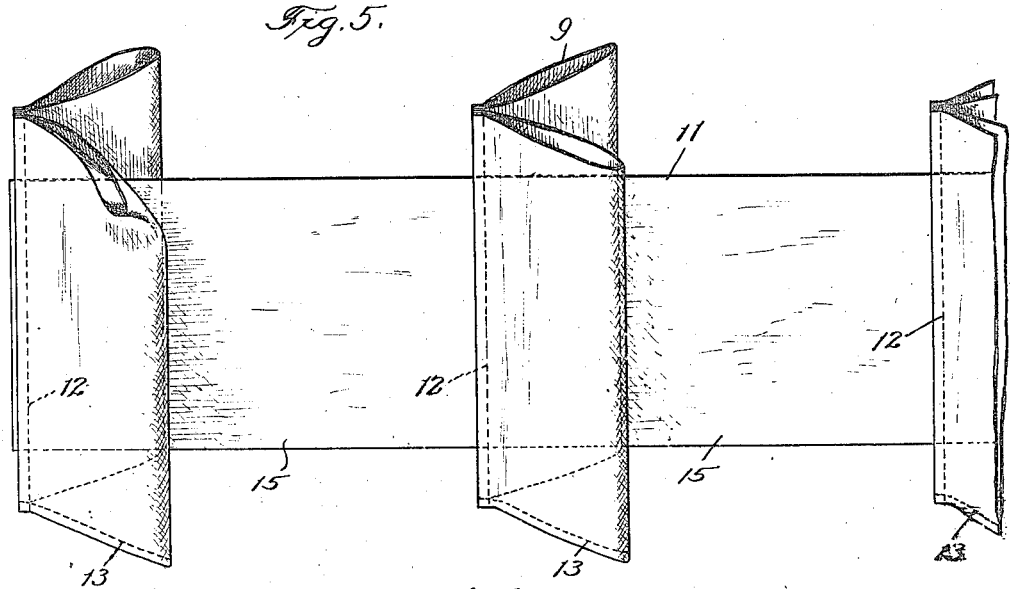
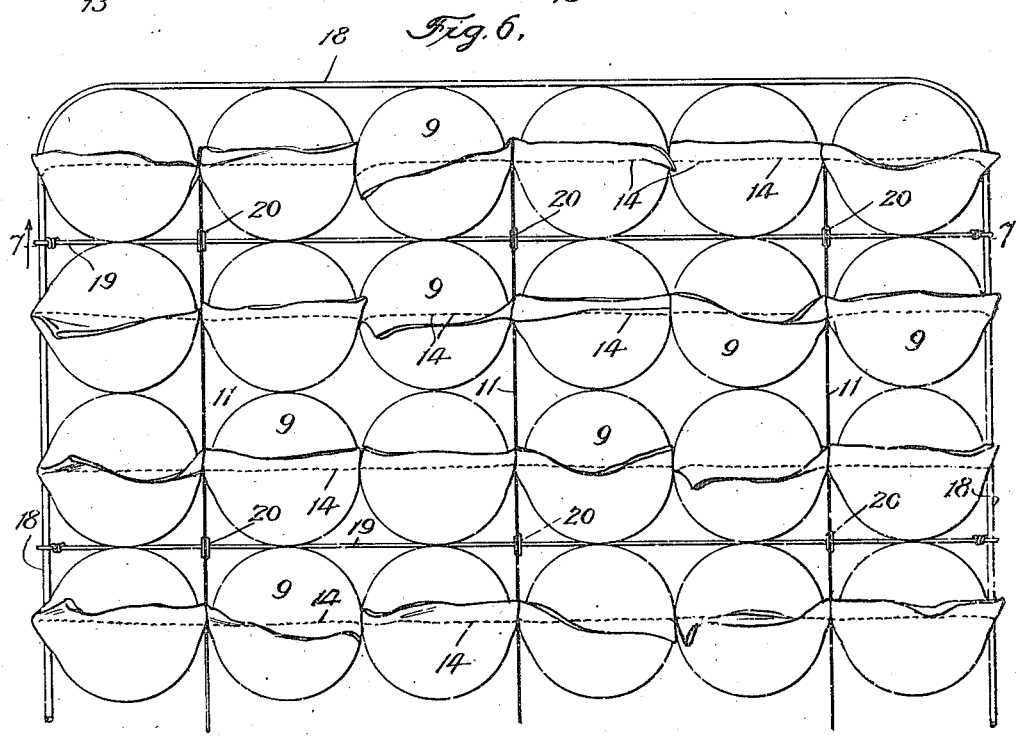

O. R. HUNT.
SPRING STRUCTURE.
APPLICATION FILED OCT. 20, 1916.

1,260,672.

Patented Mar. 26, 1918.
5 SHEETS—SHEET 4.

O. R. HUNT.
SPRING STRUCTURE.
APPLICATION FILED OCT. 20, 1916.

1,260,672.

Patented Mar. 26, 1918.
5 SHEETS—SHEET 5.

Inventor:
Ozello R. Hunt,
By Dyrenforth, Lee, Britton and Wiles
Attys.

UNITED STATES PATENT OFFICE.

OZELLO R. HUNT, OF CHICAGO, ILLINOIS.

SPRING STRUCTURE.

1,260,672.	Specification of Letters Patent.	Patented Mar. 26, 1918.

Application filed October 20, 1916. Serial No. 126,703.

*To all whom it may concern:*

Be it known that I, OZELLO R. HUNT, a citizen of the United States, residing at Chicago, in the county of Cook and State of Illinois, have invented a new and useful Improvement in Spring Structures, of which the following is a specification.

My invention relates to spring structures used in the manufacture of cushions, mattresses and other similar structures, to render the structure of the desired resiliency; and more particularly to spring structures wherein the spring proper provided in the form of a spiral is inclosed or incased in a flexible cell or housing usually formed of fabric such as light canvas.

My primary object is to provide improvements in spring structures of the general character above referred to and as hitherto provided, whereby the units or sections, desired to be used in the manufacture of a cushion or mattress, may be manufactured and assembled economically and expeditiously; and whereby the various springs may be held in the desired relation each to the other against canting and preferably in such a way that they will not become nested with each other, thereby insuring the production of a cushion, mattress, or the like, having a high degree of resiliency and with a minimum number of springs, and insuring against the breaking down of the mattress at any point.

Figure 1:
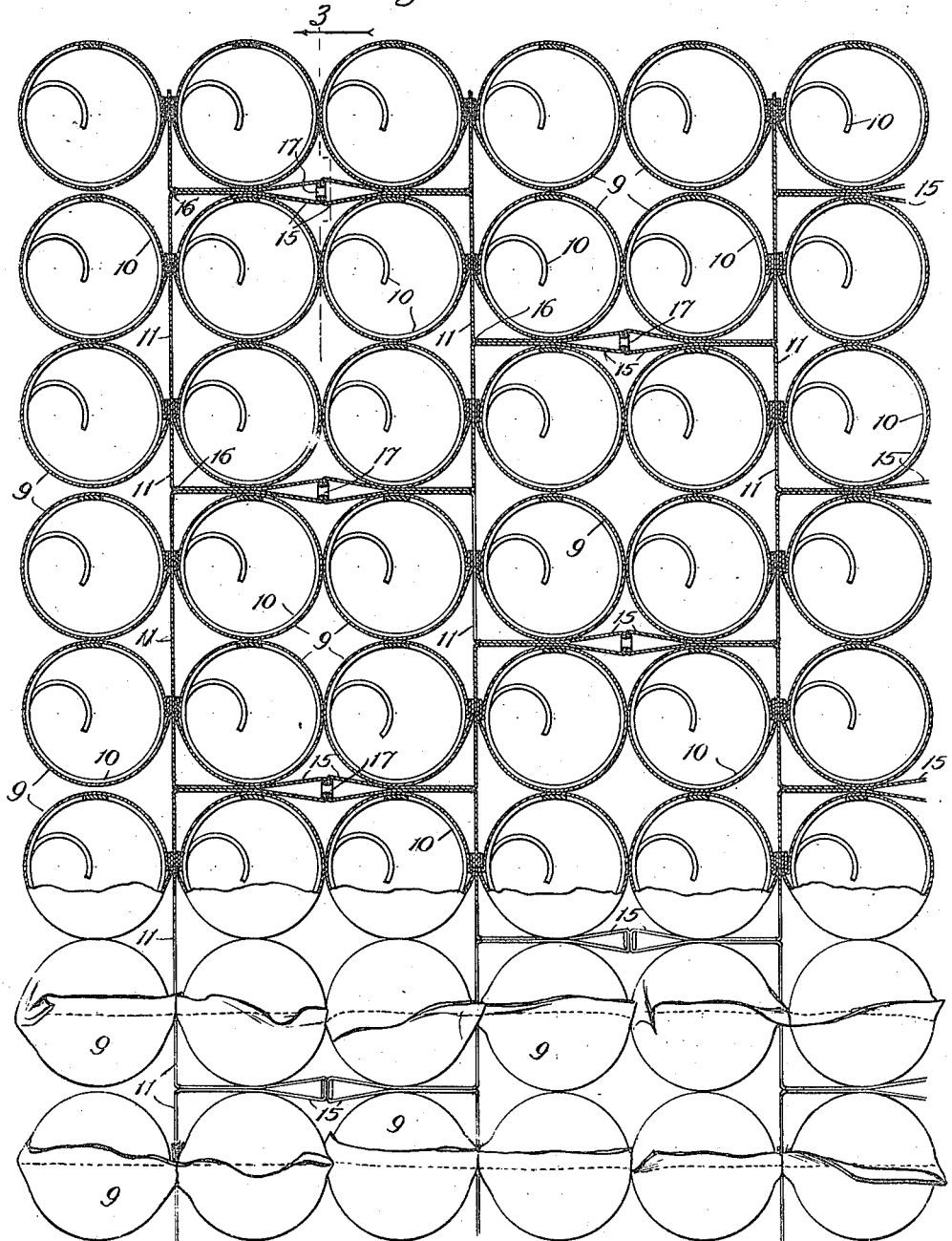
Figure 7:
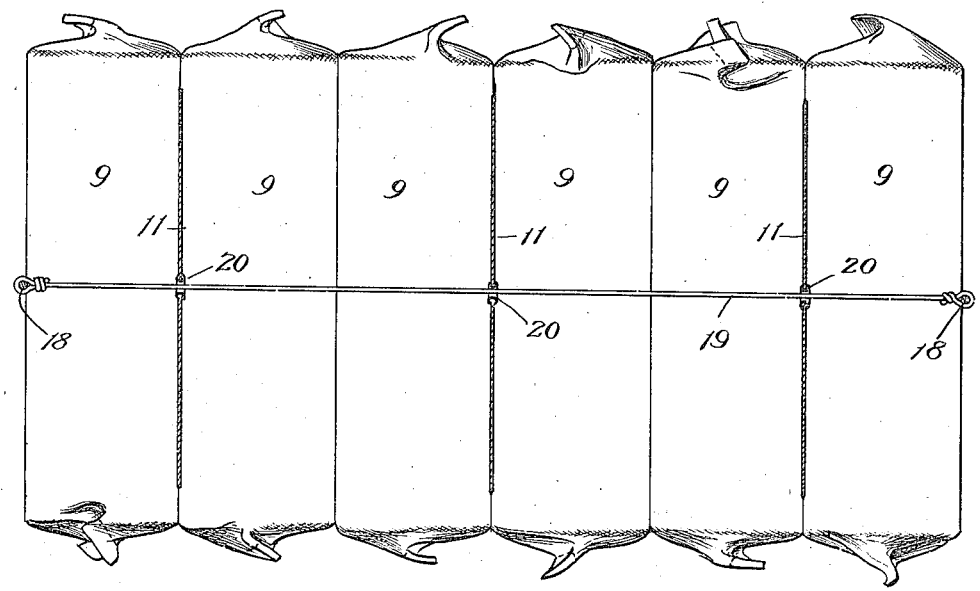
Figure 8:
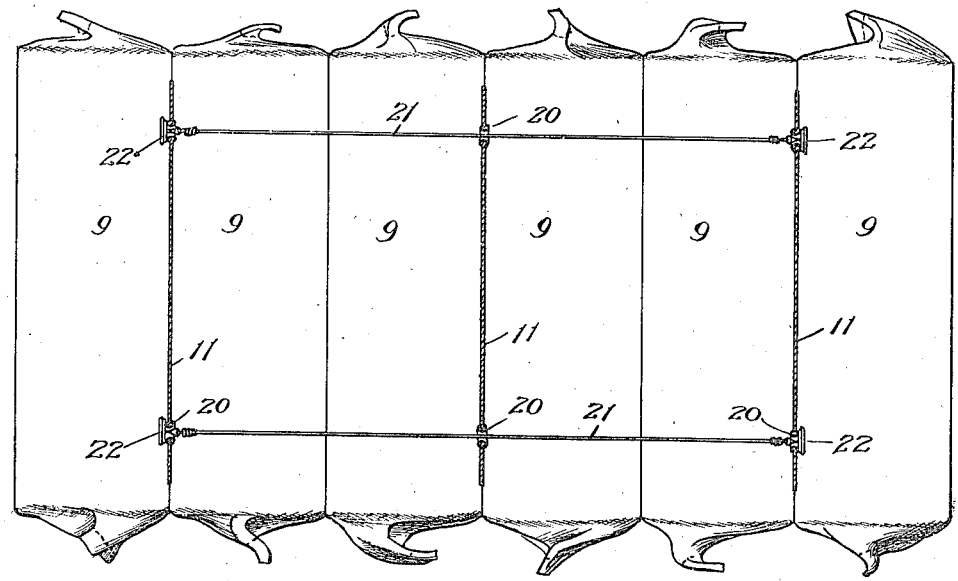
Figure 9:
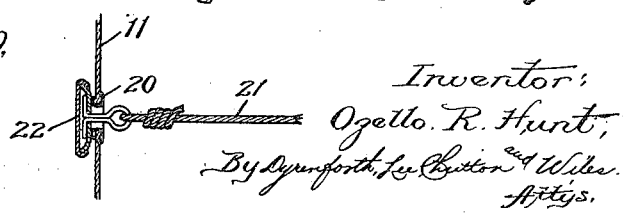
Figure 11:
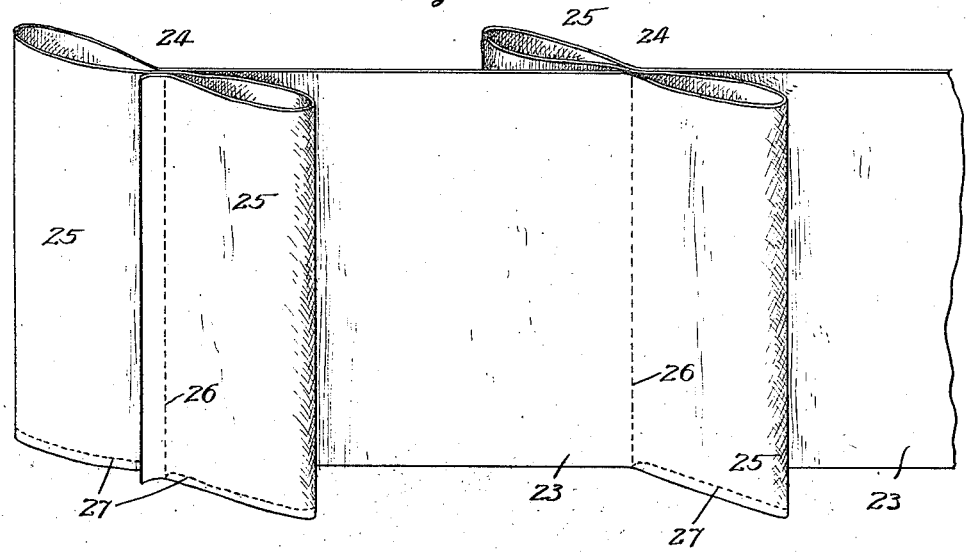
Figure 10:
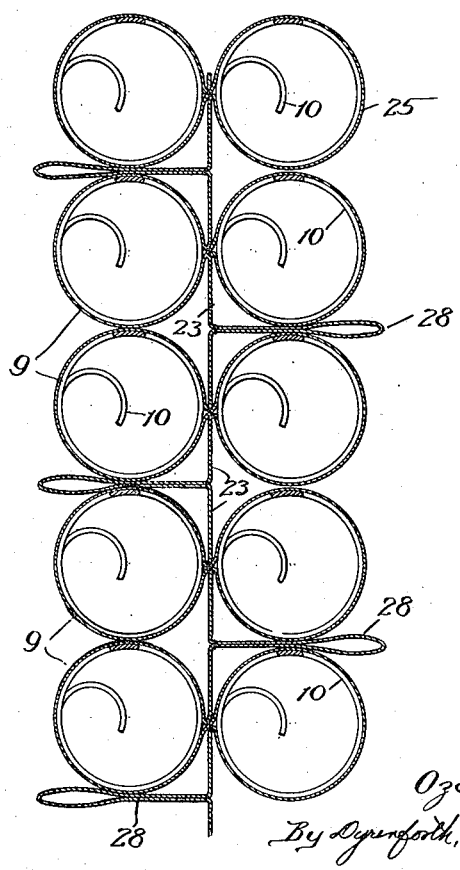

Referring to the accompanying drawings, Figure 1 is a plan view of a plurality of my improved spring structures according to the preferred embodiment of my invention, secured together in a group in one of the ways in which they may be secured in forming a mattress, cushion or the like, certain connecting parts being broken away and the cells or housings for the majority of the springs of the structures shown being broken away to disclose the interiors of the spring structures. Fig. 2 is a view similar to Fig. 1 of one of the spring structures shown in Fig. 1. Fig. 3 is a section taken at the line 3 on Fig. 1 and viewed in the direction of the arrow. Fig. 4 is a section taken at the line 4 on Fig. 2 and viewed in the direction of the arrow. Fig. 5 is a broken perspective view of the cell-forming portions and the web or strip carrying them and which with the springs, form one of the units of which the cushion or mattress is formed. Fig. 6 is a broken plan view of a cushion or seat, with the covering removed showing a slight modification of the invention. Fig. 7 is a section taken at the line 7 on Fig. 6 and viewed in the direction of the arrow. Fig. 8 is still another modification of the manner of securing together a plurality of the units. Fig. 9 is a sectional view of the detail of the securing means of Fig. 8. Fig. 10 is a view like Fig. 2 of another form in which the unit may be provided; and Fig. 11, a view like Fig. 5, showing the manner of forming the structure of Fig. 10.

According to the preferred embodiment of my invention each of the spring units above referred to and represented in Fig. 2 is formed of cells 9, preferably of fabric for receiving the spiral springs represented at 10 and which may be of the form and construction usually employed, and a web or band 11 to which the cells 9 are connected, these cells being arranged in pairs and located at intervals along the web, with the members of each pair at opposite sides of the latter. The web 11 is preferably provided as a continuous strip of fabric, and the cells 9 by preference are each of a single length of fabric turned back upon itself as shown in Fig. 5 and stitched along the line 12 to close the cell 9 and secure it, in transverse relation, to the web 11, a single line of stitching 12 passing through the free lateral edges of the material forming the pairs of cells 9, the bottoms of the cells 9 being closed as by stitching them along the lines 13. The web 11 may be of any desired width, but in order to hold the inclosed springs in the desired upright position and prevent them from canting, it is preferred that this web be of a width slightly less than the length of the springs when the latter are confined in the cells as hereinafter described, it being understood that as many of the pairs of spring-receiving cells 9 as is desired may be secured to a web 11 to provide a unit of the desired length. The springs 10 are positioned in the cells 9 by introducing them into the latter through their open ends, the springs by preference closely fitting these cells, the fabric forming the latter being preferably longer than the springs, which permits of the closing of the cells by drawing the free upper edges of the fabric forming the latter, together and stitching it as indicated along the lines 14, the springs 10 by preference being under slight tension when thus inclosed within the cells.

The units thus provided may be secured together in the desired grouped relation in the mattress or cushion structure in any desirable way, some of the ways in which they may be secured being shown in the drawings. Referring particularly to Fig. 1, the securing together of a plurality of the units is effected through the medium of laterally-extending strips provided on the webs at intervals along the latter. This manner of connecting the units is preferably accomplished by positioning the pairs of cells 9 along the web 11 at such distances apart that as to those units forming the intermediate units of a mattress or cushion structure, the sections of the web 11, between adjacent pairs of cells 9, will be equal to approximately three times the diameter of the springs 10, these sections of the web 11 being represented at 15. The provision of these sections 15 permits the folds to be taken therein as illustrated in Fig. 1, these folded parts being preferably stitched along the lines 16 and extending at substantially right angles to the median line of the web 11 and between adjacent ones of the covered springs, these folded portions 15 being alternately disposed at opposite sides of the median line of the web 11, as represented in Fig. 1. The opposed closed edges of the several strips or folds 15 are secured together in any desirable way, as for example by the eyelets 17, as shown in Figs. 1 and 3. While the unit structures at the extreme sides of the mattress or cushion may be formed, as to the folded portions 15, as explained of the intermediate unit sections, in which case the folded sections 15 at one side of the median line of the webs thereof would not be used, it is preferred that the pairs of cells 9 be so positioned along the web 11 that the lengths of fabric between the pairs of cells, necessary to produce the folded portions 15, will alternate with shorter sections of the web 11, as shown in Fig. 1. In stitching the web along the lines 16 it is preferred that the distance between the stitching 12 of adjacent cells be such that when the springs 10 are inclosed in the cells they will fit snugly together.

According to the illustration in Fig. 6 the cushion, which may be a seat of an automobile, is formed with an encircling wire frame shown in part at 18, it being understood that this frame will pass preferably entirely around the cushion. The unit structures hereinbefore referred to are introduced within the confines of the frame 18 and are of sufficient number and length to substantially fill it, and wires or other desirable means 19 are strung through the webs 11 of the units and are connected at their opposite ends with the frame 18. When the units are to be used in this connection the webs 11 are not provided with the fullnesses, or folds represented at 15 of the preceding described structures, but preferably contain eyelets 20 through which the wires 19 extend, it being preferred that the webs of each of the unit structures now being described be of continuous lengths of fabric and that the distance between adjacent points of attachment of the pairs of cells 9 to the web 11 be substantially equal to or slightly less than the diameter of the covered springs 10.

In Fig. 8 I have shown another way in which the unit structures may be secured together where the units are not mounted in a frame such as that shown in Fig. 6. In this construction wires, cords, or the like, 21, extend through the webs of the units, the ends of the wires being connected with the webs 11 of the outermost ones of the series of units. It is preferred in this arrangement that the eyelets 20 be employed preferably near the upper and lower edges of the webs 11 and that buttons, such as those shown at 22 be used for effecting the connection of the ends of the wires 21 with the outermost ones of the webs 11.

In the construction illustrated in Fig. 10 the web, here represented at 23, instead of being formed of a strip separate from the strips forming the spring-inclosing cells, is formed of sections integral with the cell-forming strips. In making these spring-units a strip of fabric of the desired length is given a double fold at the desired intervals along the strip, as shown at 24, to present pairs of tubular sections 25, as shown, the members of each pair being at opposite sides of the web 23, and the folded parts sewed in this position preferably by a single line 26 of stitching at each pair of sections 25 which passes through the three plies of material at each pair of said sections. The sections are then sewed at 27, to close the bottoms of these sections, and after the springs are inserted the tops of the cells are sewed to close them, as in the other form illustrated. Where the several spring-units for forming a mattress, or cushion, are connected together through the medium of strips on the web as explained of the other construction, the strip forming the web 23 is looped as explained of the previously described construction, and represented at 28 in Fig. 10, which latter shows a unit in which the strips 28 extend from opposite sides of the web.

It will be readily understood from the foregoing description that by providing the cell structures in connection with a web connecting them together as explained, and particularly where the web is of a relatively great width, as indicated in the drawings, the various springs with their coverings will be held firmly in upright condition, producing uniformity of resilience in the mattress or cushion and insuring the well rounded appearance of the structure.

Furthermore, the various springs 10 are held against nesting, which is desirable, inasmuch as a less number of springs may be employed in obtaining the desired resiliency.

What I claim as new and desire to secure by Letters Patent is:—

1. In a spring-structure of the character set forth, the combination of a web, series of spring-inclosing cells secured to said web at intervals along the latter to extend at the opposite sides thereof respectively, and springs in said cells.

2. In a spring-structure of the character set forth, the combination of a web, series of pairs of spring-inclosing cells secured to said web at intervals along the latter, the members of said pairs being located at opposite sides of said web respectively, and springs in said cells.

3. In a spring-structure of the character set forth, the combination of a strip, a series of spring-inclosing cells secured to said strip at intervals along the latter, and each comprising a piece of fabric with its free edges flatwise opposed and flatwise opposing said strip and secured to the latter in said position by a stitching which extends through said free edges and said strip, and springs in said cells.

4. In a spring-structure of the character set forth, the combination of a strip, a series of pairs of spring-inclosing cells secured to said strip at intervals along the latter, the members of each pair being located at opposite sides of said strip, each of said cells comprising a piece of fabric with its free edges flatwise opposed and flatwise opposing said strip, the said free edges of said pieces of fabric forming the members of each pair of cells opposing each other, stitching passing through the said opposed edges of the members of each pair of cells and through said strip, and springs in said cells.

5. In a spring-structure of the character set forth, the combination of a plurality of webs, a series of spring-inclosing cells secured to each of said webs at intervals along the latter to extend wholly to one side thereof, springs in said cells, and means connecting said webs together.

6. In a spring-structure of the character set forth, the combination of a plurality of webs, series of spring-inclosing cells secured to each of said webs at intervals along the latter to extend at the opposite sides of said webs respectively, springs in said cells, and means connecting said webs together.

7. In a spring-structure of the character set forth, the combination of rows of cell-inclosed springs arranged in non-nested condition, means connecting together cells in each row, respectively, engaging said cells intermediate their upper and lower edges, and means extending into engagement with the means connecting the cells of each row, respectively, and interposed between adjacent cells for engaging last-referred-to means intermediate their upper and lower ends.

8. In a spring-structure of the character set forth, the combination of a plurality of webs, a series of spring-inclosing cells secured to each of said webs at intervals along the latter to extend wholly to one side thereof, springs in said cells, and means connecting said webs together, said means extending substantially midway between the upper and lower edges of said webs.

9. In a spring-structure of the character set forth, the combination of a plurality of webs, a series of spring-inclosing cells secured to each of said webs at intervals along the latter to extend wholly to one side thereof, springs in said cells, members extending along opposite sides of said spring-structure in generally parallel relation to said webs, and means engaging said members and said webs for connecting the series of cells together.

OZELLO R. HUNT.